United States Patent [19]

Mizutani

[11] Patent Number: 4,727,719
[45] Date of Patent: Mar. 1, 1988

[54] APPARATUS FOR CONTROLLING INLET AIR FLOW IN A TURBOCHARGED INTERNAL COMBUSTION ENGINE

[75] Inventor: Koichi Mizutani, Seto, Japan

[73] Assignee: Toyota Jidosha Kabushiki Kaisha, Toyota, Japan

[21] Appl. No.: 12,324

[22] Filed: Feb. 9, 1987

[30] Foreign Application Priority Data

Feb. 26, 1986 [JP] Japan ................ 61-039022

[51] Int. Cl.$^4$ .............................................. F02B 37/12
[52] U.S. Cl. ........................................ 60/611; 123/432
[58] Field of Search .................... 60/600, 601, 611; 123/432, 564

[56] References Cited

U.S. PATENT DOCUMENTS

| 4,641,620 | 2/1987 | Yoshimura et al. | 123/432 |
| 4,667,636 | 5/1987 | Oishi et al. | 123/432 |

FOREIGN PATENT DOCUMENTS

| 15628 | 1/1984 | Japan | 123/432 |
| 43921 | 3/1984 | Japan | 123/432 |
| 119943 | 8/1984 | Japan | 60/611 |
| 2087975 | 6/1982 | United Kingdom | 123/432 |
| 2139700 | 11/1984 | United Kingdom | 123/432 |

Primary Examiner—Michael Koczo
Attorney, Agent, or Firm—Cushman, Darby & Cushman

[57] ABSTRACT

An apparatus for controlling inlet air flow in an internal combustion engine having a turbo-supercharger which includes an air compressor connected to a combustion chamber through two intake passages. An air flow control valve is provided in one of the intake passages and is closed while the engine is running in the accelerating transitional condition and until the pressure of the compressed air pressure reaches a predetermined value. At the same time, the ignition timing is delayed.

7 Claims, 5 Drawing Figures

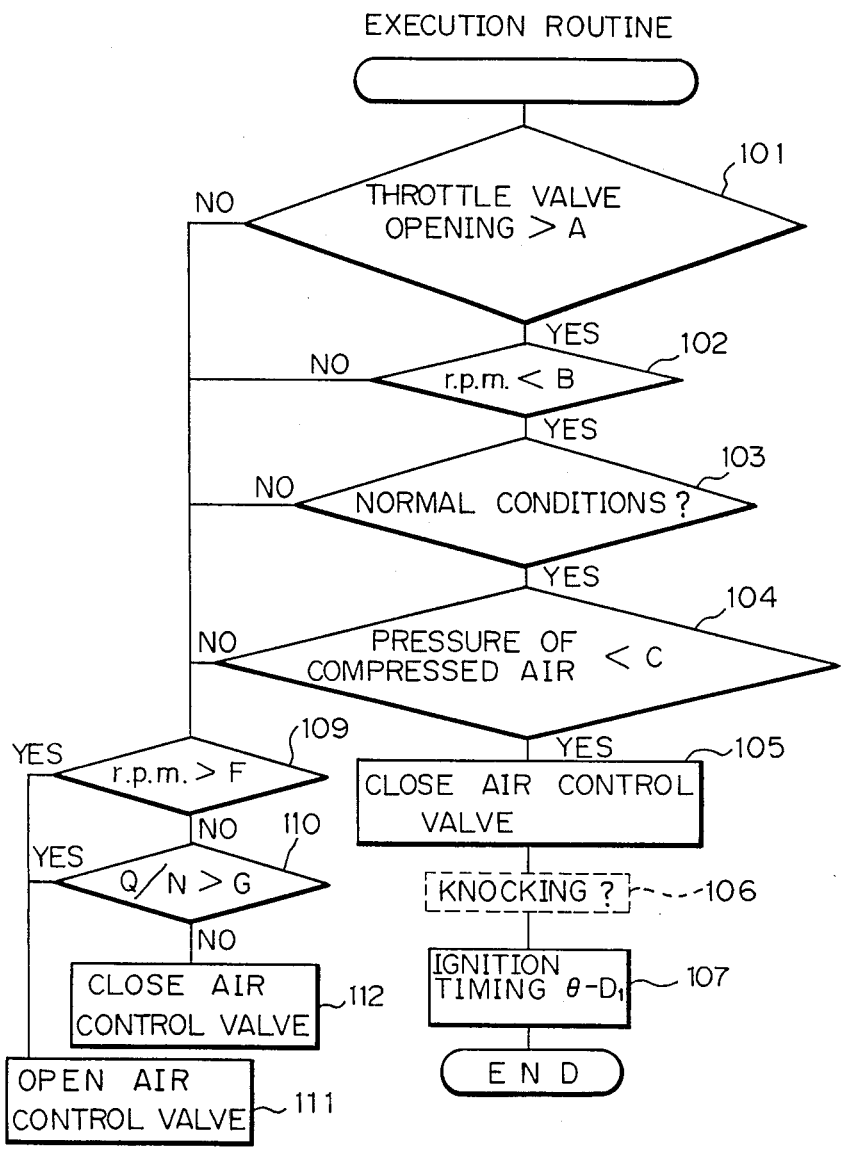

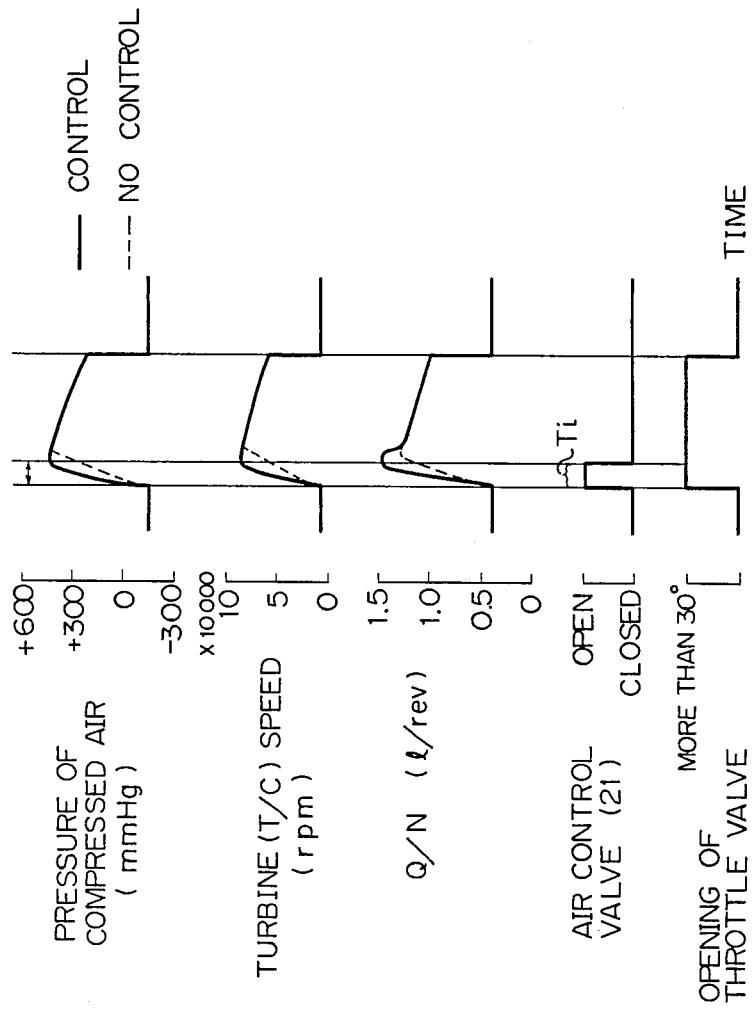

APPARATUS FOR CONTROLLING INLET AIR FLOW IN A TURBOCHARGED INTERNAL COMBUSTION ENGINE

BACKGROUND OF THE INVENTION

1. Field of the Invention

This invention relates to an apparatus for controlling inlet air flow in an internal combustion engine, and more particularly, to such an inlet air flow control apparatus in an engine having a turbo-supercharger.

2. Description of the Related Art

A known type of inlet air flow control device for an engine having a turbo-supercharger is disclosed in Japanese Unexamined Utility Model Publication 59-119943. This device comprises a first air inlet means connected via a first intake valve to a combustion chamber and a second air inlet means connected via a second intake valve to the combustion chamber, both the first and second air inlet means being connected to an air compressor of the turbo-supercharger; and an inlet air flow control valve provided in the second air inlet means, which operates in response to the compressed air pressure, i.e., the inlet air flow control valve is fully open when the compressed air pressure exceeds a predetermined value.

That is, when the engine revolutional speed is relatively low, the turbo-supercharger does not effect an air supercharging operation and, therefore, the air pressure at an intake port is low. In this condition, the inlet air flow control valve is closed so that inlet air passes only through the first air inlet means. Therefore, the flow of the inlet air is maintained at a high speed so that it is possible to supply the inlet air at a high flow speed into the combustion chamber through the inertia of the inlet air itself. On the other hand, when the engine revolutional speed is relatively high, the turbo-supercharger effects an air supercharging operation and, therefore, the inlet air flow control valve is opened in response to the pressure of the air. In this condition, the compressed inlet air passes through both the first and second air inlet means, so that it is possible to obtain a high engine output power.

In a known inlet air flow control device as mentioned above, in an accelerating transitional condition of the engine, as the inlet air flow control valve remains open until the pressure of the compressed air reaches a predetermined value, the flow speed of the inlet air is increased due to the effects of the inertia of the inlet air itself. Accordingly, to make the most effective use of the inertia of the inlet air, the inlet air flow control valve should remain closed until the engine revolutional speed reaches a predetermined value. However, in an accelerating transitional condition of the engine there is an abrupt increase of the inlet air flow speed, and accordingly, knocking will occur and cause a loss of engine torque, which results in a reduced inlet air flow speed and a delay in the time at which the turbo-supercharger has an effect, thus affecting the acceleration response of the engine.

SUMMARY OF THE INVENTION

An object of the present invention is to provide an inlet air flow controlling apparatus of an internal combustion engine having a turbo-supercharger, capable of preventing a drop in the inlet air flow speed due to knocking of the engine when the engine is in an accelerating transitional condition.

According to the present invention, there is provided an apparatus for controlling the inlet air flow in an internal combustion engine having a turbo-supercharger; the turbo-supercharger having a turbine driven by the pressure of an exhaust gas and an air compressor actuated by the turbine and connected to a combustion chamber of the engine through at least two intake passages, so that the inlet air compressed thereby is supplied to the combustion chamber, the engine having a means for controlling ignition timing; wherein the apparatus comprises, an air control valve provided in one of the intake passages; means for detecting an accelerating transitional condition of the engine; means for detecting a pressure of the inlet air compressed by the air compressor; means for closing the air flow control valve and delaying the ignition timing while the engine is running in the accelerating transitional condition and until the pressure of the compressed air reaches a predetermined value.

In the present invention, the air flow control valve is temporarily closed when the engine is running in the accelerating transitional condition, so that the inlet air flows into the combustion chamber through the other intake passage not having an air control valve. With the help of the inertia of the inlet air itself, the air flows at a relatively high speed so that the efficiency of the volume thereof is improved. Although knocking is usually readily generated in this condition, the generation of such knocking will be prevented, since the ignition timing is delayed at the same time as the air flow control valve is closed. Therefore, according to the present invention, in an accelerating transitional condition of the engine, the inlet air flow speed will be rapidly increased and, therefore, the engine torque also will be rapidly increased. It will be possible, therefore, to reduce the time lag before the turbo-supercharger has an effect, and thus to improve the acceleration response of the engine.

BRIEF DESCRIPTION OF THE DRAWINGS

FIG. 3 is a flow chart illustrating the inlet air flow control process according to the present invention;

DESCRIPTION OF THE PREFERRED EMBODIMENTS

Figure 1:
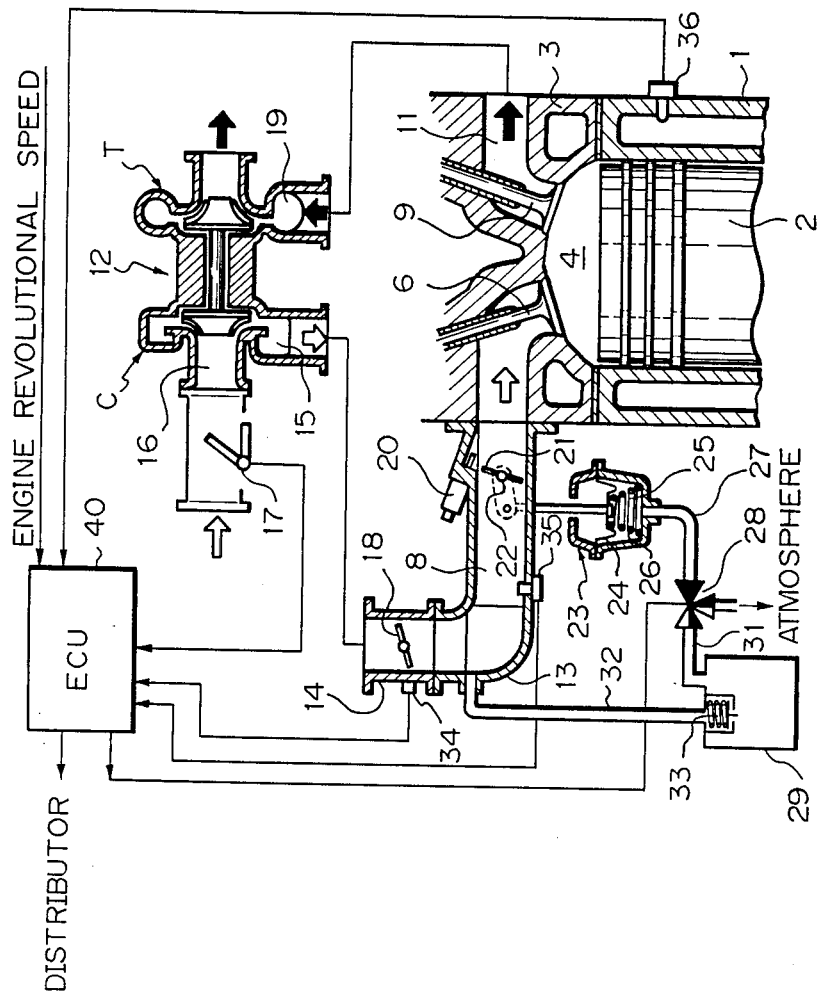
FIG. 1 is a cross-sectional view of an internal combustion engine, taken along line I—I in FIG. 2, having a turbo-supercharger according to the present invention.
Figure 2:
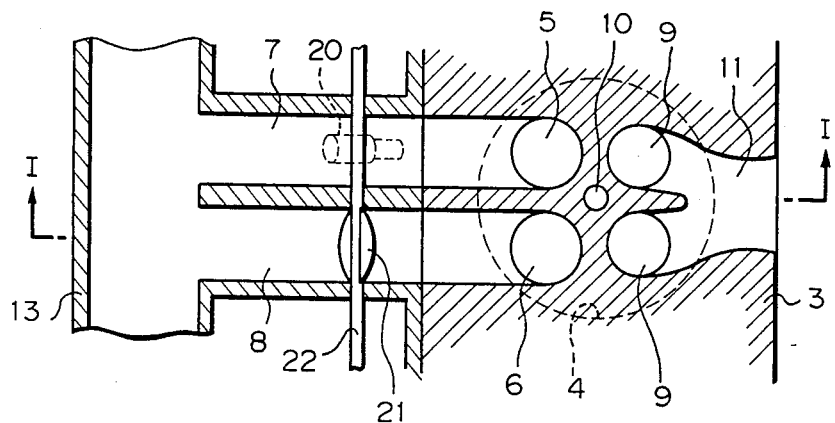
FIG. 2 is a horizontal cross-sectional view of the engine shown in FIG. 1.

Referring now to FIGS. 1 and 2, an internal combustion engine includes a cylinder block 1, a piston 2, a cylinder head 3, a combustion chamber 4, a first intake valve 5, a second intake valve 6, a first intake passage 7 connected to the first intake valve 5, a second intake passage 8 connected to the second intake valve 6, a pair of exhaust valves 9, an ignition plug 10, a pair of exhaust ports 11, and a turbo-supercharger 12.

As is well known, the turbo-supercharger 12 comprises an air compressor C and a turbine T connected to the compressor C. The upstream portions of the first and second intake passages 7 and 8 are joined together and connected via intake pipes 13 and 14 to an air outlet chamber 15 of the air compressor C. An air suction port 16 of this compressor C is connected to an air flow meter 17 and an air cleaner (not shown) and then communicated to the atmosphere. A throttle valve 18 connected to an acceleration pedal (not shown) is located in the air intake pipe 14.

On the other hand, the downstream portions of the exhaust ports 11 are joined together and connected to an exhaust gas inlet chamber 19 of the turbine T. The exhaust gas supplied into this chamber 19 serves to rotate the turbine T, and is then discharged to the atmosphere. Upon rotation of the turbine T, the compressor C is also rotated to compress the inlet air, which is then supplied from the air outlet chamber 15 of the compressor C via the intake pipes 14 and 13 and the pair of intake passages 7 and 8 into the combustion chamber 4.

In the upper portion of the first intake passage 7 is provided a fuel injector 20 which injects fuel into the first intake passage 7. On the other hand, in the second intake passage 8 is provided an air control valve 21, which comprises a valve stem 22 connected to a diaphragm 24 of an air diaphragm actuator 23. A compression spring 26 is disposed in a vacuum chamber 25 of the air diaphragm actuator 23, which is connected via a vacuum conduit 27 to a vacuum switching valve 28. The vacuum switching valve 28 is connected via a vacuum conduit 31 to a vacuum tank 29. This vacuum tank 29 is connected via a one-way valve 33 and a conduit 32 to the engine intake pipe 13 of the engine so that a necessary vacuum pressure is maintained in the vacuum tank 29 through the engine intake pipe 13.

A throttle sensor 34 for detecting the opening of the throttle valve 18, a pressure sensor 35 for detecting the air pressure compressed by the turbo-charger 12, a knocking sensor 36 for detecting possible knocking or vibration of the engine, and a speed sensor (not shown) for detecting the engine revolutional speed are also provided. The signals from these sensors, together with the signal from the above-mentioned air flow meter 17, are input to an electronic control unit (ECU) 40. Also, thermo-sensors for detecting the temperatures of the engine cooling water, the inlet air, and the ambient air are provided, although not illustrated in the drawings, and the signals from these sensors are also input to the ECU 40. On the other hand, a signal for controlling the ignition timing is output from the ECU 40 to a distributor (not shown) and a signal for actuating the vacuum switching valve 28 is also output from the ECU 40.

FIG. 3 is a flowchart for illustrating the operational process of the inlet air flow control according to the present invention. First, at steps 101 to 103, it is determined whether or not the engine is running in accelerating transitional condition. That is, at step 101, it is determined whether or not the opening of the throttle valve 18 (FIG. 1) exceeds a predetermined value A (for example, 30°). If the valve opening exceeds A (Yes at step 101), the operation moves to step 102. At step 102, it is determined whether or not the engine revolutional speed is smaller than a predetermined value B (for example, 2000 rpm). If the engine speed is smaller than B (Yes at step 102), the operation moves to step 103. At step 103, it is determined whether or not the engine is running in normal condition, on the basis of the temperatures of the cooling water, the inlet air, the ambient air, and the like.

Assuming that the engine is running in a normal condition, for example, the temperature of the cooling water is lower than 60° C., the temperature of the inlet air is lower than 80° C. in a surge-tank (not shown) and lower than 65° C. in the air flow meter 17 (FIG. 1), the knocking sensor 36 (FIG. 1) and other sensors indicate normal conditions, respectively, and in the case of an engine provided with an intercooler for cooling the compressed inlet air, the intercooler is operating normally.

If the engine is running under normal conditions (Yes at step 103) as mentioned above, the operation moves to step 104. It is assumed that the engine is running in an accelerating transitional condition if all of the conditions prescribed at steps 101 to 103 are satisfied.

At step 104, it is determined whether or not the pressure of the compressed air detected by the pressure sensor 35 (FIG. 1) has reached a predetermined value C. If it is impossible to directly detect the pressure of the compressed air, a value equivalent thereto can be calculated from Q/N, instead of using the pressure sensor 35 (FIG. 1). Here, Q: the flow of inlet air; and N: the engine revolutional speed.

If the pressure of the compressed air is lower than C (Yes at step 104), the operation moves to step 105, and a signal is output to close the air flow control valve 21 (FIGS. 1 and 2). Consequently, the vacuum switching valve 28 in FIG. 1 is turned so that the vacuum passage 31 is communicated with the passage 27. Therefore, the vacuum pressure is transmitted from the vacuum tank 29 to the vacuum chamber 25 of the air diaphragm actuator 23, so that the diaphragm 24 moves downward in FIG. 1 against the spring 26 and the air flow control valve 21 closes the second air passage 8.

At the same time, at step 107, the advanced angle $\theta$ of the ignition timing is reduced by $D_1$ (i.e., the operation, $\theta$-$D_1$, is executed) to delay the ignition timing. In this case, the delay D may be variable on the basis of a map (not shown) which is predetermined in accordance with the engine revolutional speed and stored in the memory of the ECU 40 (FIG. 1). In general, the higher the engine revolutional speed, the larger the amount of delay D.

In another embodiment, a step 106 may be provided between the steps 105 and 107. In step 106, it is determined whether or not engine knocking is generated, according to the engine vibration detected by the knocking sensor 36 (FIG. 1). If knocking is generated in the engine, $D_2$ ($D_2 > D_1$) should be substituted for $D_1$ in step 107 so that the ignition timing delay is made larger, as $\theta$-$D_2$. If knocking is not generated, the ignition timing delay is, of course, set as $\theta$-$D_1$.

Figure 4:
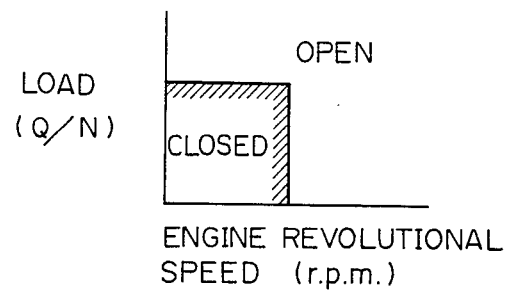
FIG. 4 is a diagram illustrating the open/close control of an inlet air flow control valve during a normal driving condition; and, FIG. 5 is a diagram illustrating the effects which will be obtained by the inlet air flow control according to the present invention.

During steps 101 to 103, unless it is determined that the engine is running in accelerating transitional condition, or it is determined at step 104 that the pressure of the compressed air has reached the predetermined value C, the inlet air flow is controlled according to a normal running control procedure, as shown in FIG. 4. That is, the operation moves to steps 109 and 110, where it is determined whether or not the engine revolutional speed is higher than a predetermined value F, or whether or not Q/N (the air flow per one revolution) is higher than a predetermined value G. If the engine revolutional speed is higher than F, or if Q/N is higher than G, the operation moves to step 111, where the air control valve 21 (FIGS. 1 and 2) is opened. Consequently, the vacuum switching valve 28 is turned so that the vacuum passage 27 is opened to the atmosphere. Therefore, ambient pressure is introduced into the vacuum chamber 25 of the diaphragm actuator 23, so that the diaphragm 24 moves upward in FIG. 1 with the help of the spring 26 and, therefore, the air flow control valve 21 opens the second air passage 8.

On the other hand, if the engine revolutional speed is not higher than F, and if Q/N is not more than G, the operation moves to step 112, where the air flow control valve 21 (FIGS. 1 and 2) is closed.

FIG. 5 is a diagram illustrating both conditions for controlling the inlet air flow. The condition in which the air control valve 21 is temporarily closed and the ignition timing is also temporarily delayed in an accelerating transitional condition of the engine, as mentioned above with reference to steps 101 to 108, is shown by solid lines, and the condition in which such controls of the air control valve 21 and the ignition timing are not executed is shown by dotted lines.

As clearly shown in FIG. 5, the pressure of the compressed air, the turbine revolutional speed of the turbo-supercharger (T/C) 12, and Q/N (inlet air flow per one engine revolutional speed with respect to the cylinder volume) indicating engine load are increased, respectively, especially during the initial period ($T_1$), by controlling the air flow control valve 21 to be temporarily closed during the initial period ($T_1$) while the throttle valve is opened by more than the predetermined value A, for example, 30°.

What is claimed:

1. An apparatus for controlling inlet air flow in an internal combustion engine having a turbo-supercharger; said turbo-supercharger having a turbine driven by a pressure of an exhaust gas and an air compressor actuated by said turbine and connected to a combustion chamber of said engine through at least two intake passages so that inlet air compressed thereby is supplied to said combustion chamber, said engine having a means for controlling ignition timing; wherein said apparatus comprises:

an air flow control valve provided in one of said intake passages;
   means for detecting an accelerating transitional condition of said engine;
   means for detecting a pressure of inlet air compressed by said air compressor;
   means for closing said air flow control valve and delaying an ignition timing while said engine is running in the accelerating transitional condition and until a pressure of the compressed air reaches a predetermined value.

2. An apparatus as set forth in claim 1, wherein a fuel injector is provided in the other of said intake passages.

3. An apparatus as set forth in claim 1, wherein said air compressor is connected to the combustion chamber through a common intake pipe and said at least two intake passages are branched therefrom, a throttle valve is provided in said common intake pipe, and said means for detecting an accelerating transitional condition comprises a means for detecting an opening of said throttle valve.

4. An apparatus as set forth in claim 3, wherein said means for detecting an accelerating transitional condition further comprises a means for detecting a revolutional speed of said engine.

5. An apparatus as set forth in claim 4, wherein it is determined that said engine is in an accelerating transitional condition if an opening of said throttle valve exceeds a predetermined value and if the revolutional speed of the engine is lower than a predetermined value.

6. An apparatus as set forth in claim 4, wherein said means for detecting an accelerating transitional condition further comprises a means for detecting temperatures of cooling water of said engine and the intake air.

7. An apparatus as set forth in claim 6, wherein it is determined that the engine is in an accelerating transitional condition if the opening of said throttle valve exceeds a predetermined value if the revolutional speed of said engine is lower than a predetermined value and if the temperatures of cooling water of said engine and the intake air are lower than predetermined values.

* * * * *